(12) United States Patent
Aoyama

(10) Patent No.: US 7,599,568 B2
(45) Date of Patent: Oct. 6, 2009

(54) IMAGE PROCESSING METHOD, APPARATUS, AND PROGRAM

(75) Inventor: Tatsuya Aoyama, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 614 days.

(21) Appl. No.: 11/107,922

(22) Filed: Apr. 18, 2005

(65) Prior Publication Data
US 2005/0243350 A1 Nov. 3, 2005

(30) Foreign Application Priority Data
Apr. 19, 2004 (JP) .............................. 2004-122531

(51) Int. Cl.
G06K 9/40 (2006.01)
G06K 9/48 (2006.01)
G06K 9/38 (2006.01)
G03B 13/00 (2006.01)
G06F 15/00 (2006.01)

(52) U.S. Cl. ..................... 382/255; 382/199; 382/269; 382/271; 348/345; 358/1.9

(58) Field of Classification Search ................. 382/255; 358/1.9
See application file for complete search history.

(56) References Cited

U.S. PATENT DOCUMENTS

| 5,212,516 | A | * | 5/1993 | Yamada et al. | 348/354 |
| 5,710,829 | A | * | 1/1998 | Chen et al. | 382/173 |
| 5,790,709 | A | * | 8/1998 | Kopeika et al. | 382/254 |
| 6,738,197 | B2 | * | 5/2004 | Fujii | 359/698 |
| 7,356,254 | B2 | * | 4/2008 | Aoyama | 396/147 |
| 2003/0002746 | A1 | | 1/2003 | Kusaka | 382/255 |
| 2003/0118245 | A1 | * | 6/2003 | Yaroslavsky et al. | 382/255 |
| 2003/0184667 | A1 | | 10/2003 | Aoyama | 348/333.12 |
| 2003/0197715 | A1 | * | 10/2003 | Hosokawa et al. | 345/619 |

FOREIGN PATENT DOCUMENTS

JP 7-121703 A 5/1995

* cited by examiner

Primary Examiner—Brian P Werner
Assistant Examiner—Jose M Torres
(74) Attorney, Agent, or Firm—Birch, Stewart, Kolasch & Birch, LLP

(57) ABSTRACT

A blur checking region is determined by selecting a region in which a blur tends to clearly appear in a digital photograph image as the blur checking region. Then, an image of a region corresponding to the blur checking region is obtained as a checking image in a corrected image obtained by performing blur correction processing on the digital photograph image. Then, the obtained checking image is displayed in a size appropriate for the resolution of a display device.

21 Claims, 9 Drawing Sheets

HISTOGRAM OF WIDTHS OF EDGES

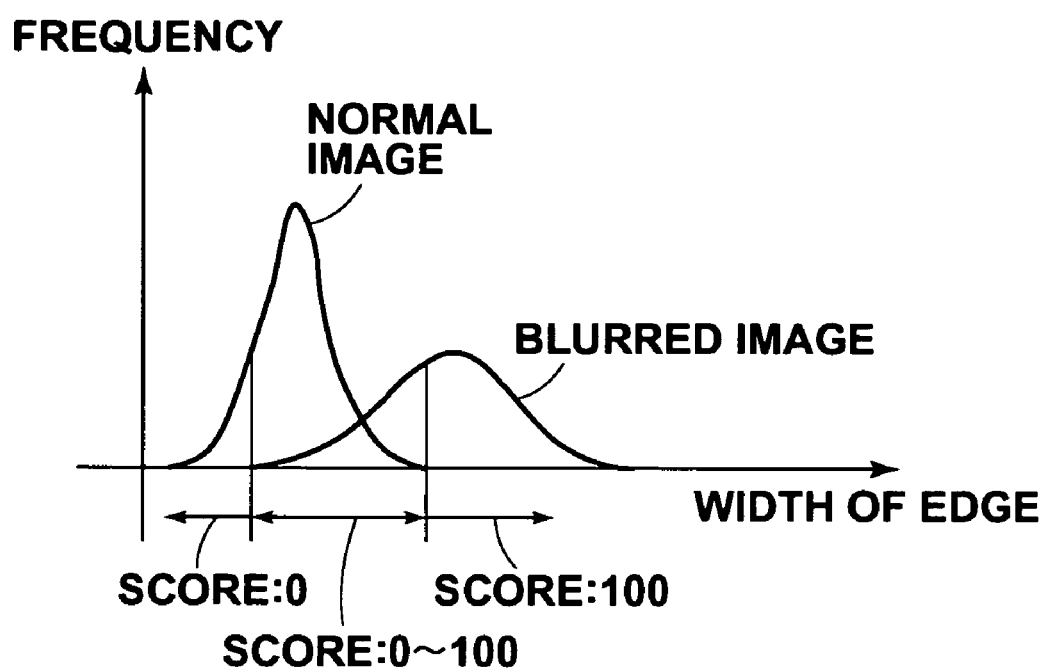

IMAGE PROCESSING METHOD, APPARATUS, AND PROGRAM

BACKGROUND OF THE INVENTION

1. Field of the Invention

The present invention relates to image processing. Particularly, the present invention relates to an image processing method, apparatus and program for checking the effect of blur correction processing performed on digital photograph images.

2. Description of the Related Art

Digital photograph images are obtained by photoelectrically reading out photograph images recorded on photograph films such as negative films and color reversible films with a readout device such as a scanner. Digital photograph images are also obtained by photographing subjects with digital still cameras (DSC). When the digital photograph images are obtained, various kinds of image processing are performed on the digital photograph images, and images after image processing are displayed, printed, or the like. One of the examples of the image processing is blurred image restoration processing for removing a blur from a fuzzy image (blurred image).

When photograph images are obtained by photographing a subject, the images may become fuzzy because of an out-of-focus blur or a blur due to hand motion. The out-of-focus blur is created when focal length is not adjusted appropriately, whereas the blur due to hand motion is created when a camera is moved because of the motion of the hands of a photographer (hereinafter referred to as a motion blur, for short). If a blur is an out-of-focus blur, a point image spreads two-dimensionally. In other words, the out-of-focus blur spreads non-directionally in the photograph image. If the blur is a motion blur, the point image traces a certain locus, and the point image in the image spreads linearly. In other words, the motion blur spreads directionally in the photograph image.

Conventionally, various methods for restoring blurred images have been proposed in the field of digital photograph images. If information such as the direction of a motion blur and the width of the motion blur is obtained during photography, the blurred image can be restored by applying a restoration filter such as a Wiener filter and an inverse filter to the obtained photograph image. Therefore, a method for restoring blurred images by installing an apparatus (for example, an acceleration sensor) for obtaining the direction of the motion blur and the width of the motion blur in a photography apparatus is well known. In this method, information such as the direction of the motion blur and the width of the motion blur are obtained simultaneously with photography, and the blurred image is restored based on the obtained information (for example, U.S. Patent Application Publication No. 20030002746).

Further, as disclosed in Japanese Unexamined Patent Publication No. 7(1995)-121703, for example, a method for restoring a blurred image (image including a blur) by setting a deterioration function with respect to the blurred image is also well known. In this method, the blurred image is restored by applying a restoration filter corresponding to the deterioration function set for the image. Then, an image after restoration is evaluated, and the deterioration function is set again based on the result of evaluation. The restoration, evaluation, and new setting of the deterioration function are repeated until an image having desired quality is obtained.

Meanwhile, as cellular phones rapidly became popular, the performance of the cellular phones has improved. Especially, the performance of digital cameras (hereinafter referred to as cellular cameras, for short) attached to the cellular phones has remarkably improved. In recent years, the number of pixels of the cellular cameras exceeded one million. Therefore, the cellular cameras are used in a similar manner to ordinary digital cameras. Therefore, when people travel with their friends, they often use their cellular cameras to take their photographs. Further, many users of the cellular phones take photographs of their favorite TV stars or athletes with their cellular cameras. Under these circumstances, more users of the cellular phones who enjoy the photographs obtained with their cellular cameras by displaying them on the monitors of their cellular phones also print the photographs in a similar manner to printing of those obtained with ordinary digital cameras.

However, since the main bodies (cellular phones) of the cellular cameras are not ergonomically designed as specialized photography devices, there is a problem that it is not easy to hold the cellular phones during photography. Further, since no strobes are provided in the cellular cameras, the shutter speeds of the cellular cameras are slower than those of the ordinary digital cameras. Therefore, when a photograph of a subject is taken with a cellular camera, possibility of creation of a motion blur is high in comparison with photography with ordinary cameras. If the motion blur is large, the photographer can detect the blur in the image displayed on the monitor of his/her cellular phone. However, if the motion blur is small, he/she often does not notice the blur in the image displayed on the monitor, and he/she notices the blur only when the image is printed. Therefore, it is required to perform processing for correcting motion blurs in photograph images obtained with the cellular cameras.

However, in competition among cellular phone manufacturing companies, each company is trying to reduce the sizes of cellular phones as well as improving the performance of the cellular phones and reducing the production cost thereof. Therefore, it is not practical to install a device for obtaining the direction and width of a motion blur in the camera attached to the cellular phones. Hence, the method as disclosed in U.S. Patent Application Publication 20030002746 can not be applied to the cellular phones. Further, in the method as disclosed in Japanese Unexamined Patent Publication No. 7(1995)-121703, it is required to repeat processing such as setting of a deterioration function, restoration, evaluation, and resetting of the deterioration. Therefore, there is a problem that processing time becomes long, and the efficiency of processing drops. Under these circumstances, there is a method for performing correction processing by obtaining blur information (the direction of a blur, the width of the blur, or the like) of an image by analyzing the image. In this method, the image is corrected by setting a parameter for correcting blurs based on the obtained blur information. For example, when a blur is created in an image, a point image in the image spreads. Specifically, the shapes of edges in the image are directly related to the blur. Therefore, this characteristic may be utilized to perform correction processing. In this method, blur information is obtained by analyzing the shapes of the edges in the image to perform correction processing. In the method as described above, the blur information can be obtained from the digital photograph images without installing a special device in the photography device. Further, since correction processing is performed based on the blur information, it is not required to repeat processing as in the method disclosed in Japanese Unexamined Patent Publication No. 7(1995)-121703. Hence, efficiency of processing is high.

As described above, there are many kinds of methods for performing blur correction processing on digital photograph images, and the timing of correction processing is different from each other among the methods. For example, blur correction processing is performed on digital photograph images which will be printed, as preprocessing for printing the digital photograph images. Alternatively, blur correction processing is performed on images attached to e-mails, at servers for relaying the e-mails between cellular phones. Further, in some cases, when images are obtained by photography with digital cameras (including cellular cameras), blur correction processing is performed on the images within the digital cameras, and the corrected images are stored in storage means such as memory cards attached to the digital cameras.

The corrected images are displayed on display screens such as monitors to cause users to check the effects of correction processing performed on the digital photograph images. However, for example, if an image is obtained by photographing with a cellular camera, the obtained image will be displayed on the monitor of the cellular camera. However, since the resolution of the monitor is low, the size of the corrected image must be reduced so that the image can be displayed on the monitor of the cellular phone. Since the reduced image is displayed on the monitor of the cellular camera, it is impossible to check the effects of blur correction processing. Therefore, among digital cameras which are on sale, there are digital cameras in which the condition of blurs can be more easily checked by making the users of the digital cameras specify display regions in images obtained by photography. In these digital cameras, the users display the images of the specified display regions on the monitors of the digital cameras at a 1:1 magnification ratio or by enlarging them. If the digital cameras as described above are used, the effects of blur correction processing can be checked by reading out an image on which correction processing has been performed, and displaying an image of the region specified by the users at a 1:1 magnification ratio or by enlarging them.

Alternatively, as disclosed in U.S. Patent Application Publication No. 20030184667, a method for extracting an image of a predetermined region such as the central region of the image, and displaying it at a 1:1 magnification ratio has been proposed. Further, a method for dividing an image into a plurality of regions and sequentially displaying the divided regions at a 1:1 magnification ratio has been proposed.

However, in the method of making users specify display regions, the users are required to specify the regions which will be checked, and that is troublesome for the users. Further, although blurs are evenly distributed in the whole regions of the images, there are regions in which the blurs can be easily detected, and there are also regions in which the blurs cannot be easily detected, or cannot be detected at all. For example, when an image is divided into regions as illustrated by dotted lines in FIG. 3, if only a block in the upper left corner of the image is observed, it is impossible to judge whether the image is blurred. However, a blur is clearly distinguishable in a block including the hair region of a subject (a person in the example illustrated in FIG. 3), or the contours of the ears of the subject or the like. When the users check the effects of blur correction processing performed on the image as illustrated in FIG. 3, if they check a region such as the block in the upper left corner, in which the blur does not tend to clearly appear, it is impossible to know whether the blur is corrected. It is also impossible to know the magnitude of correction. Further, in the method of making the users specify display regions, the users cannot always accurately specify the regions which are appropriate for checking the effects of blur correction processing. Therefore, the users may erroneously specify the regions by making wrong judgments.

Further, in a method of displaying a region at a predetermined position of an image by extracting it from the image, as disclosed in U.S. Patent Application Publication No. 20030184667, there is a problem that if the region at the predetermined position of the image is not appropriate for checking the effects of blur correction processing, the users cannot accurately judge the effects of correction processing. Further, in the method of dividing an image into a plurality of regions and sequentially displaying the divided regions, there is a problem that a long time is required for processing. Further, the load of processing on the apparatus is heavy, and the operation is troublesome for the users.

SUMMARY OF THE INVENTION

In view of the foregoing circumstances, it is an object of the present invention to provide an image processing method, apparatus, and program for efficiently check the effects of blur correction processing performed on digital photograph images.

An image processing method according to the present invention is an image processing method comprising the steps of:

determining a blur checking region by selecting a region in which a blur tends to clearly appear in a digital photograph image as the blur checking region;

obtaining an image of a region corresponding to the blur checking region as a checking image in a corrected image obtained by performing blur correction processing on the digital photograph image; and displaying the obtained checking image in a size appropriate for the resolution of a display device.

In the present invention, the "digital photograph image" may be a digital image obtained by photographing a subject with a digital camera or like. Alternatively, the "digital photograph image" may be a digital image obtained by reading out an image on a silver-halide film, printed matter (for example, a print), or the like with a read-out apparatus such as a scanner. Hereinafter, for the purpose of simplifying descriptions, the term "image" is used to represent the digital photograph image.

In an image processing method according to the present invention, it is preferable that an image of the blur checking region is extracted from the digital photograph image, and displayed on the display device together with the checking image.

It is preferable that an image processing method according to the present invention comprises the steps of:

extracting edges from the digital photograph image;

obtaining the number of the extracted edges for each of a plurality of regional images having the same size, which are formed by dividing the digital photograph image into blocks; and determining the blur checking region by selecting a region corresponding to a regional image which has a largest number of the edges as the blur checking region.

Further, an image processing method according to the present invention may comprise the steps of:

extracting edges from the digital photograph image;

obtaining the width of a blur in the digital photograph image;

obtaining the number of edges which have the same width as that of the blur for each of a plurality of regional images having the same size, which are formed by dividing the digital photograph image into blocks; and determining the blur checking region by selecting a region corresponding to a regional image which has a largest number of the edges as the blur checking region.

Further, in an image processing method according to the present invention, it is preferable that if the blur is a motion blur which is a directional blur, the method comprises the steps of:

extracting edges from the digital photograph image for each of a plurality of different directions;

obtaining the direction of the motion blur in the digital photograph image;

obtaining the number of edges in the same direction as that of the motion blur for each of a plurality of regional images having the same size, which are formed by dividing the digital photograph image into blocks; and determining the blur checking region by selecting a region corresponding to a regional image which has a largest number of the edges as the blur checking region.

Further, it is preferable that the size of the regional image is determined based on the resolution of the display device.

An image processing apparatus according to the present invention is an image processing apparatus comprising:

a blur checking region determination means for determining a blur checking region by selecting a region in which a blur tends to clearly appear in a digital photograph image as the blur checking region;

a checking image obtainment means for obtaining an image of a region corresponding to the blur checking region as a checking image in a corrected image obtained by performing blur correction processing on the digital photograph image; and a display control means for displaying the obtained checking image in a size appropriate for the resolution of a display device.

It is preferable that the checking image obtainment means further extracts an image of the blur checking region from the digital photograph image, and the display control means displays the checking image on the display device together with the image of the blur checking region in the digital photograph image.

Further, in an image processing apparatus according to the present invention, it is preferable that the blur checking region determination means includes an edge extraction means for extracting edges from the digital photograph image, an edge number calculation means for obtaining the number of the extracted edges for each of a plurality of regional images having the same size, which are formed by dividing the digital photograph image into blocks, and a determination means for determining the blur checking region by selecting a region corresponding to a regional image which has a largest number of the edges as the blur checking region.

Further, in an image processing apparatus according to the present invention, the blur checking region determination means may include an edge extraction means for extracting edges from the digital photograph image, a blur width obtainment means for obtaining the width of a blur in the digital photograph image, an edge number calculation means for obtaining the number of edges which have the same width as that of the blur for each of a plurality of regional images having the same size, which are formed by dividing the digital photograph image into blocks, and a determination means for determining the blur checking region by selecting a region corresponding to a regional image which has a largest number of the edges as the blur checking region.

Further, it is preferable that if the blur is a motion blur which is a directional blur, the blur checking region determination means includes an edge extraction means for extracting edges from the digital photograph image for each of a plurality of different directions, a motion blur direction obtainment means for obtaining the direction of the motion blur in the digital photograph image, an edge number calculation means for obtaining the number of edges in the same direction as that of the motion blur for each of a plurality of regional images having the same size, which are formed by dividing the digital photograph image into blocks, and a determination means for determining the blur checking region by selecting a region corresponding to a regional image which has a largest number of the edges as the blur checking region.

Further, it is preferable that the size of the regional image is determined based on the resolution of the display device.

The image processing method according to the present invention may be provided as a program for causing a computer to execute the method.

According to the image processing method and apparatus of the present invention, a region for checking blurs is determined by selecting a region of a digital photograph image before correction processing as a blur checking region for checking the effects of correction processing performed on the digital photograph image. The region selected as the blur checking region is a region in which a blur tends to clearly appear. Then, an image in a region corresponding to the determined blur checking region is extracted from the corrected image as a blur checking image. The extracted image is displayed on a display device in a size appropriate for the size of the display device. If the effect of correction processing is sufficient, blurs in the whole digital photograph image are eliminated or reduced. However, the effects of correction processing are reflected more in an image of a region in the corrected image, which corresponds to the region of the image before correction processing, in which the blur tends to clearly appear. The region in which the blur tends to clearly appear is a region such as a hair region and the region of facial contours. The effects of correction processing are reflected less in a region of the corrected image, which corresponds to the region of the image before correction processing, in which the blur does not tend to appear or does not tend to clearly appear. The region in which the blur does not tend to appear or does not tend to clearly appear is a region such as the upper left corner in the image illustrated in FIG. 3 and blocks at the ends of the image. Therefore, if the effects of correction processing are checked by extracting an image of a region corresponding to a region of the image before correction processing, in which the blur tends to clearly appear, from the corrected image, the effects of correction processing can be accurately judged. Further, since a part (checking image) of the corrected image can be displayed on the display device in a size appropriate for the size of the display device, even if the display device is a device such as the monitor of a cellular camera, of which the resolution is low, the effects of correction processing can be correctly checked.

Further, in the image processing method and apparatus according to the present invention, the blur checking image is automatically extracted from the corrected image, and displayed. Therefore, the users are not required to specify the regions. Further, it is not required to sequentially display the regions of the image. Therefore, image processing can be performed efficiently.

Further, if an image of the blur checking region is extracted from the digital photograph image before correction processing, and the extracted image is displayed together with the checking image extracted from the corrected image, the users can compare the condition of the blurs between the image before correction processing and the corrected image. Therefore, the users can more accurately check the effects of blur correction processing.

Note that the program of the present invention may be provided being recorded on a computer readable medium. Those who are skilled in the art would know that computer readable media are not limited to any specific type of device, and include, but are not limited to: floppy disks, CD's RAM'S, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 10 is a diagram for explaining calculation of the degree of a blur;

DESCRIPTION OF THE PREFERRED EMBODIMENTS

Hereinafter, embodiments of the present invention will be described with reference to the attached drawings.

Figure 1:
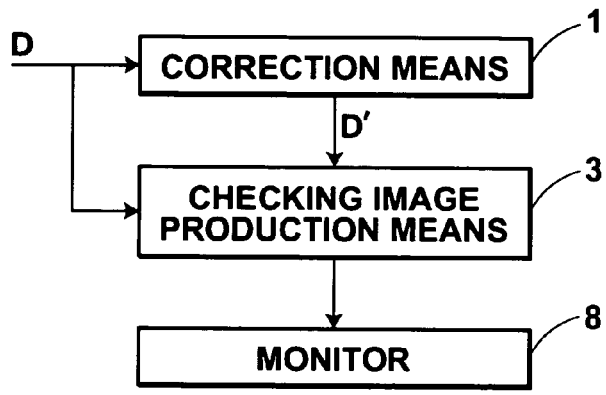
FIG. 1 is a block diagram illustrating the configuration of an image processing apparatus in a first embodiment of the present invention.

FIG. 1 is a block diagram illustrating the configuration of an image processing apparatus in a first embodiment of the present invention. The image processing apparatus according to the present embodiment performs blur correction processing on digital photograph images (hereinafter referred to as images, for short). The image processing apparatus also makes users check the effects of blur correction processing. As illustrated in FIG. 1, the image processing apparatus includes a correction means 1 for obtaining a corrected image D' by performing blur correction processing on an image D which has been input. The image processing apparatus also includes a checking image production means 3 for producing a checking image using the corrected image D' and the image D. The checking image is an image for checking the effects of blur correction processing performed by the correction means 1. The image processing apparatus also includes a monitor 8 for displaying the checking image produced by the checking image production means 3. It is assumed that the monitor 8 in the image processing apparatus according the present embodiment has a resolution of QVGA (Quarter Video Graphics Array), namely 320 pixels×240 pixels, for example.

Figure 2:
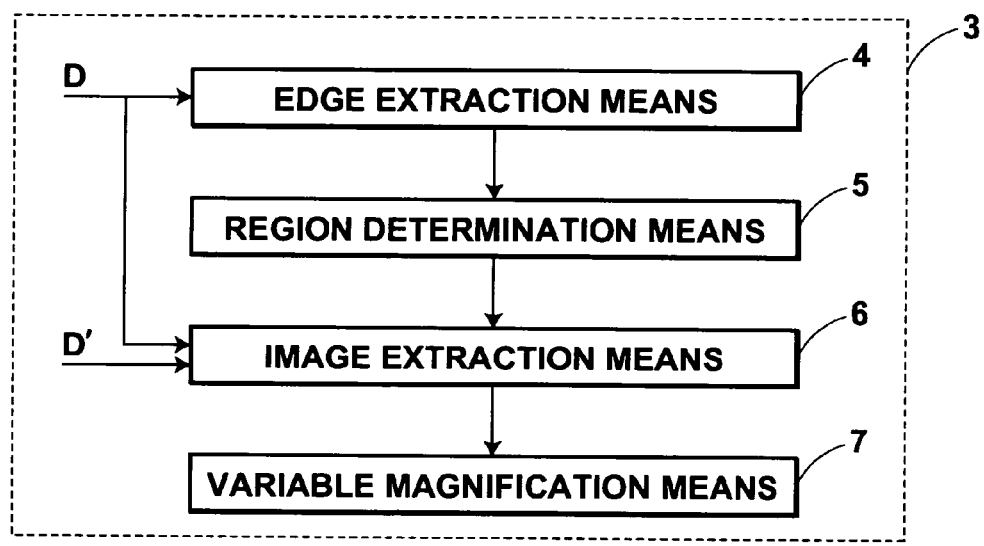
FIG. 2 is a block diagram illustrating the configuration of a checking image production means 3 in the image processing apparatus illustrated in FIG. 1.

FIG. 2 is a block diagram illustrating the configuration of the checking image production means 3 in the image processing apparatus according to the embodiment illustrated in FIG. 1. As illustrated in FIG. 2, the checking image production means 3 includes an edge extraction means 4 for extracting an edge from the image D. The checking image production means 3 also includes a region determination means 5. The region determination means 5 calculates the number of edges extracted by the edge extraction means 4 for each region having a size (320 pixels×240 pixels in this case) which is appropriate for the resolution of the monitor 8, and determines a blur checking region, based on the calculated number of edges in each region, by selecting a region in which the number of edges is the largest as the blur checking region. The checking image production means 3 also includes an image extraction means 6. The image extraction means 6 extracts an image of a blur checking region determined by the region determination means 5 from the image D, and extracts an image of a region corresponding to the blur checking region from the corrected image D'. The checking image production means 3 also includes a variable magnification means 7. The variable magnification means 7 synthesizes an image so that the two images extracted by the image extraction means 6 are displayed side by side, and reduces the size of the synthesized image at a reduction ratio of 1/2.

Here, each of the two images extracted by the image extraction means 6 has a size of 320 pixels×240 pixels. Therefore, when the two images are combined to synthesize an image, the size of the synthesized image is 640 pixels×480 pixels. However, since reduction processing is performed on the synthesized image by the variable magnification means 7, the size of the synthesized image is reduced to 320 pixels×240 pixels.

The monitor 8 displays the image obtained by the checking image production means 3. Specifically, an image of a region which has a largest number of edges in the image D and an image of a corresponding region in the corrected image D' are displayed side by side on the monitor 8.

Figure 3:
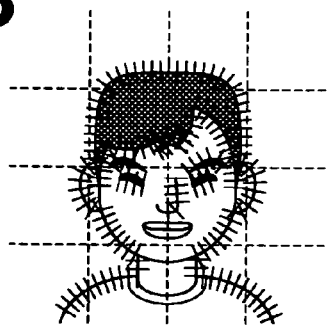
FIG. 3 is a diagram illustrating an example of edge distribution in an image.

As described above, in the image processing apparatus according to the present embodiment, an image of a region corresponding to a region in which the number of edges is small is not extracted from the corrected image D' as the checking image. The region in which the number of edges is small is a region, such as a block at the end of the image and a block of a flat region of a face in the image illustrated in FIG. 3, in which a blur does not tend to clearly appear even if a blur is present in the region. However, an image of a region corresponding to a region in which edges are concentrated, such as a hair region and a region including ears is extracted from the corrected image D', and displayed. Therefore, the users can efficiently check the effects of blur correction processing performed on the image.

Further, since the image in the same region of the image D before correction is displayed together with the checking image extracted from the corrected image D', the users can compare the images of the same region between before and after processing. Therefore, the users can efficiently check the effects of correction processing.

Figure 4:
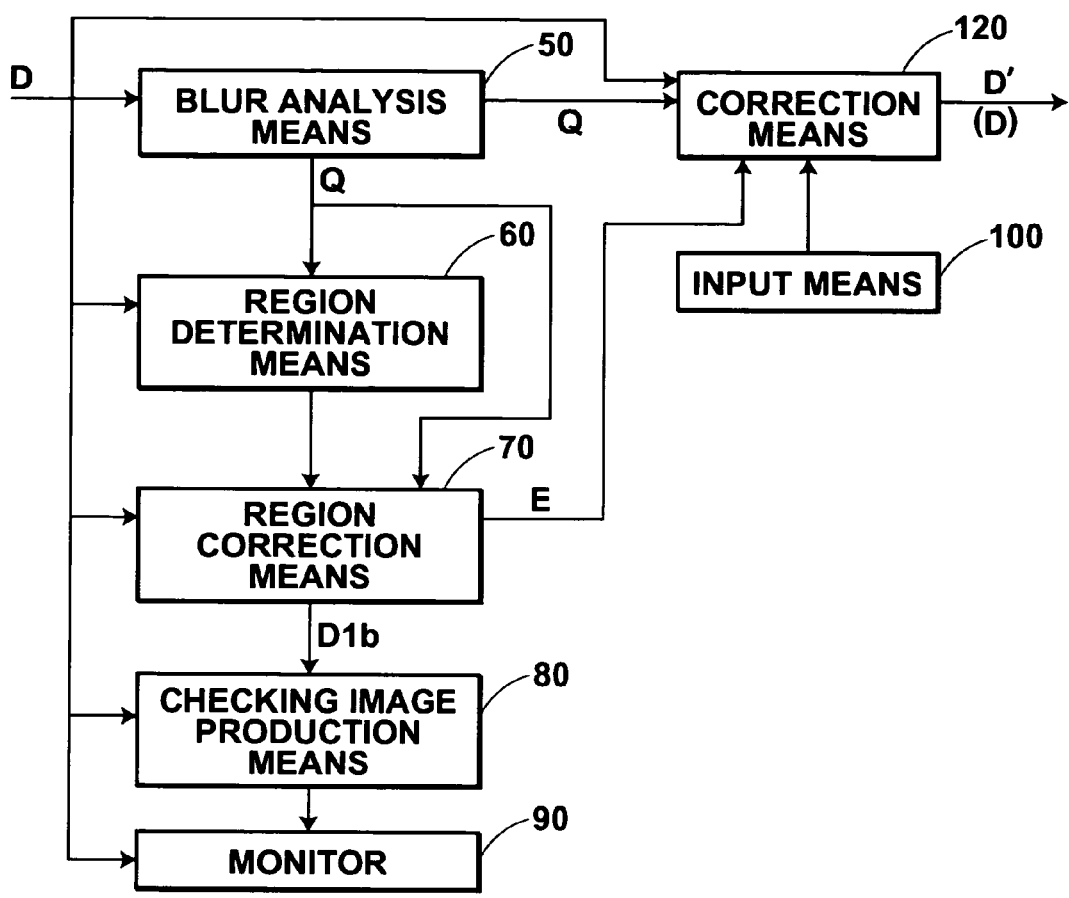
FIG. 4 is a block diagram illustrating the configuration of an image processing apparatus in a second embodiment of the present invention.

FIG. 4 is a block diagram illustrating the configuration of an image processing apparatus in a second embodiment of the present invention. As illustrated in FIG. 4, the image processing apparatus according to the present embodiment includes a blur analysis means 50 for analyzing the condition of blurs in the input image D. The image processing apparatus also includes a region determination means 60. The region determination means 60 determines a region (hereinafter referred to as an object region) which is an object of correction processing which will be performed by a region correction means 70, which will be described later. The image processing apparatus also includes the region correction means 70 for obtaining a corrected image D1b by performing blur correction processing on an image of the object region in the image D, determined by the region determination means 60. The image processing apparatus also includes a checking image production means 80. The checking image production means 80 extracts an image of the object region determined by the region determination means 60 from the image D, and synthesizes an image by combining the extracted image with the corrected image D1b obtained by the region correction means 70. Then, the checking image production means 80 enlarges or reduces the synthesized image at a variable magnification ratio so that the size of the image becomes appropriate for the resolution of a monitor 90, which will be described later. The image processing apparatus also includes the monitor 90 for displaying the checking image obtained by the checking image production means 80. The image processing apparatus also includes an input means 100 for making the users input instructions as to whether correction processing should be performed on the original image D corresponding to the checking image displayed on the monitor 90. The image processing apparatus also includes a correction means 120 for outputting the image D without performing processing on the image D or after performing processing on the image D based on the instructions input by the users at the input means 100. In the image processing apparatus according to the present embodiment, it is assumed that the resolution of the monitor 90 is L1×L2, which is larger than QVGA, for example.

Figure 5:
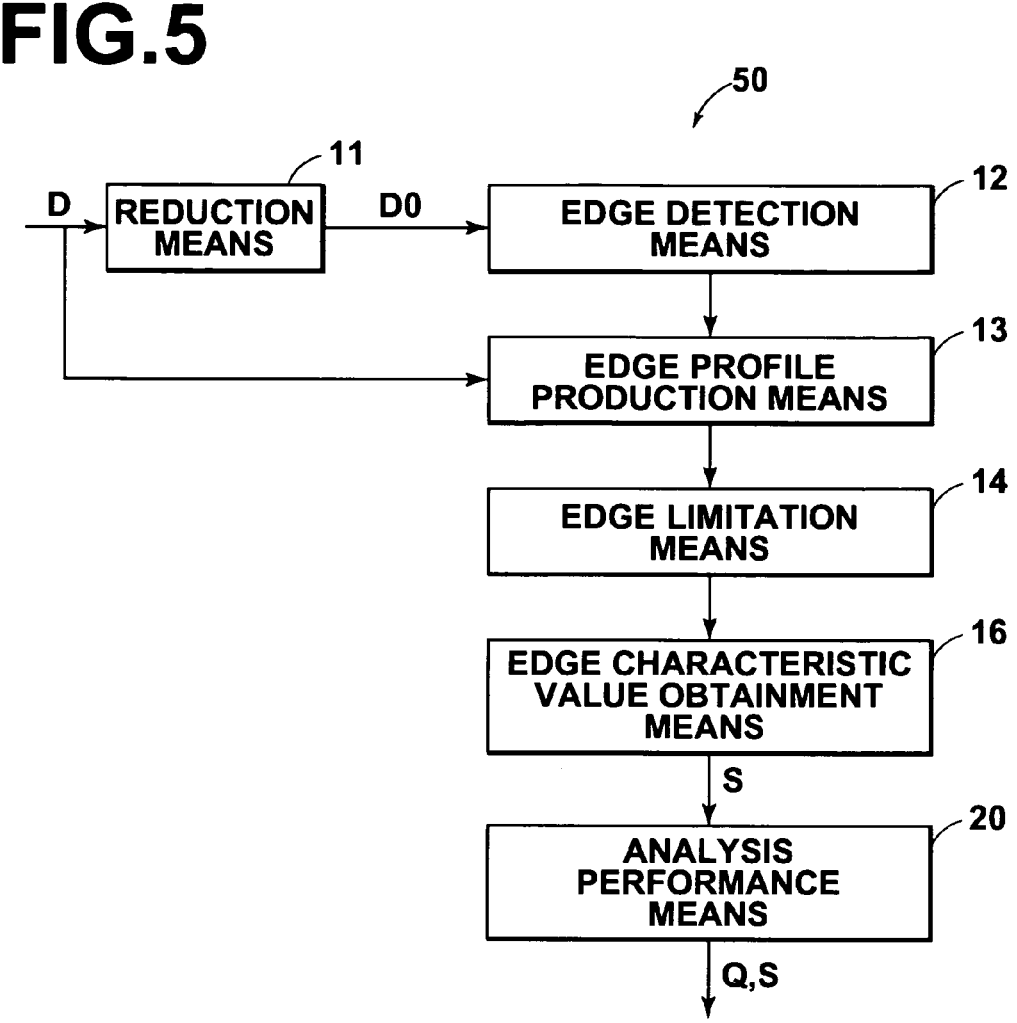
FIG. 5 is a block diagram illustrating the configuration of a blur analysis means 50 in the image processing apparatus illustrated in FIG. 4.
Figure 6:
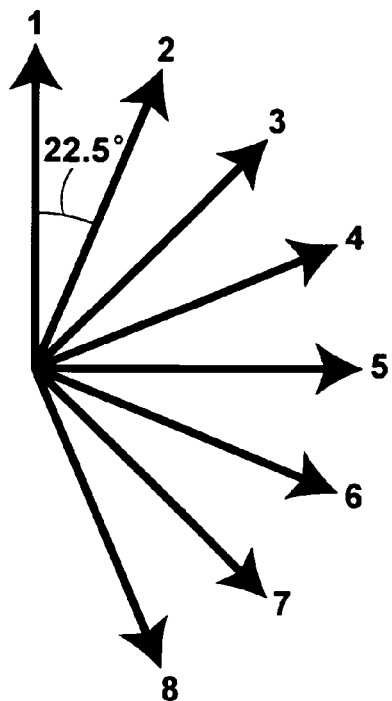
FIG. 6 is a diagram illustrating directions of edge detection processing.

FIG. 5 is a block diagram illustrating the configuration of the blur analysis means 50 in the image processing apparatus illustrated in FIG. 4. As illustrated in FIG. 5, the blur analysis means 50 includes a reduction means 11 for obtaining a reduced image D0 of the image D by performing reduction processing on the image D. The blur analysis means 50 also includes an edge detection means 12 for detecting an edge for each of eight directions as illustrated in FIG. 6, which are different from each other. The blur analysis means 50 also includes an edge profile generation means 13 for generating the profile of the edge detected by the edge detection means 12. The blur analysis means 50 also includes an edge limitation means 14 for removing invalid edges. The blur analysis means 50 also includes an edge characteristic value obtainment means 16 for obtaining the characteristic value S of the edge obtained by the edge limitation means 14. The blur analysis means 50 also includes an analysis performance means 20. The analysis performance means 20 calculates the direction of a blur in the image D, the degree N of a blur in the image D, the degree K of a motion blur in the image D, and the width L of the blur in the image D using the characteristic value S of the edge. Then, the analysis performance means 20 outputs the calculated data as blur information Q to the correction means 120, region determination means 60, and region correction means 70.

The reduction means 11 reduces the image D at a reduction ratio of 1/8, for example, to obtain the reduced image D0. Then, the reduction means 11 outputs the reduced image D0 to the edge detection means 12.

The edge detection means 12 detects an edge of which the intensity is higher than or equal to a predetermined value in each of eight directions as illustrated in FIG. 6 using the reduced image D0. Then, the edge detection means 12 obtains coordinate positions of the edges, and outputs them to the edge profile generation means 13.

Figure 7:
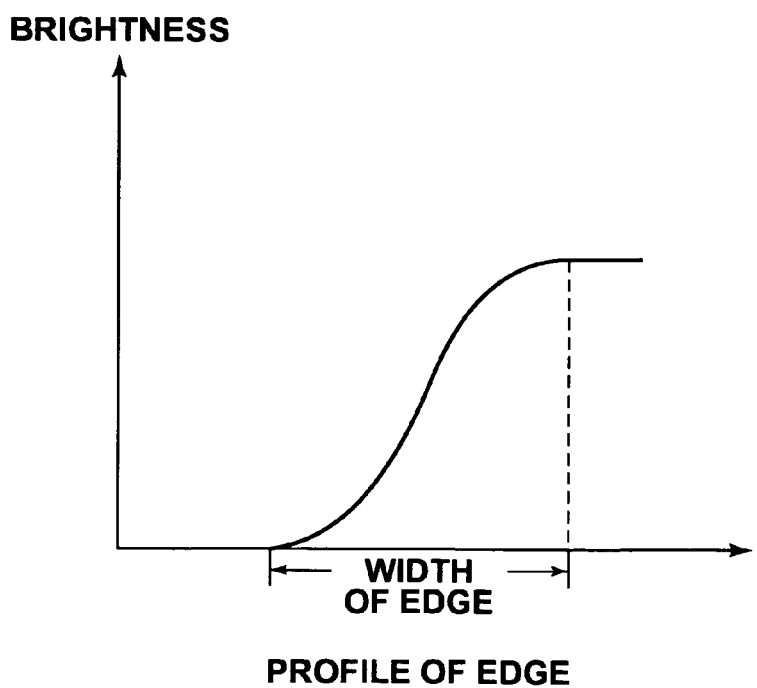
FIG. 7 is a diagram illustrating an edge profile.

The edge profile generation means 13 generates the profiles of these edges, as illustrated in FIG. 7, using the image D. The edge profile generation means 13 generates the profile of the edge based on the coordinate positions of each edge in each direction, detected by the edge detection means 12. Then, the edge profile generation means 13 outputs the profile to the edge limitation means 14.

The edge limitation means 14 removes invalid edges based on the profile of the edge, output from the edge detection means 12. The invalid edges are edges having complicated profile shapes, and edges including light sources (for example, edges of which the brightness is higher than or equal to a predetermined value), or the like. The edge limitation means 14 outputs the profiles of the remaining edges to the edge characteristic value obtainment means 16.

Figure 8:
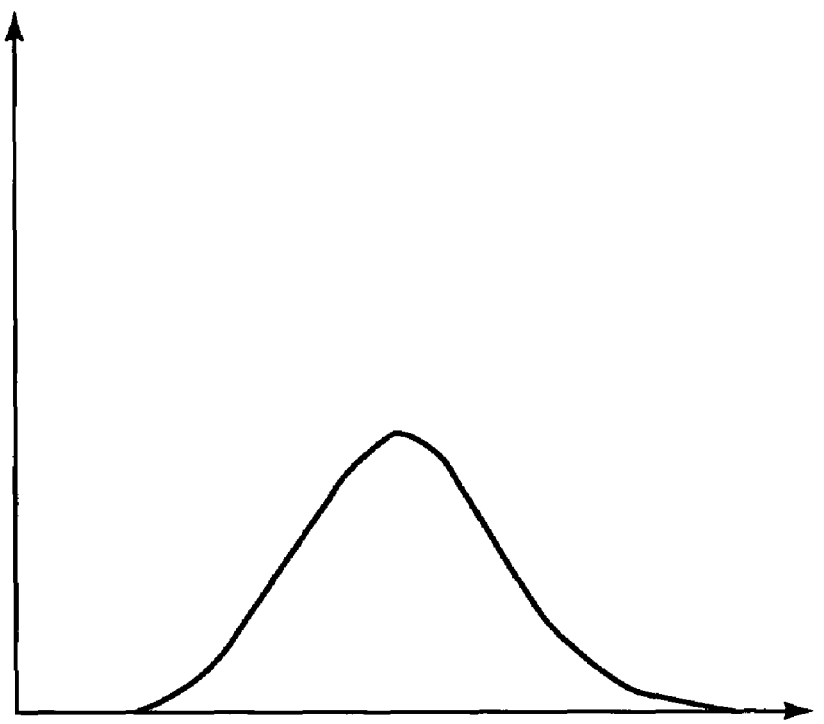
FIG. 8 is a histogram of the widths of edges.

The edge characteristic value obtainment means 16 obtains the width of each edge as illustrated in FIG. 7 based on the profiles of the edges, output by the edge limitation means 14. Then, the edge characteristic value obtainment means 16 generates a histogram of the widths of the edges as illustrated in FIG. 8 for each of the eight directions illustrated in FIG. 6. Then, the edge characteristic value obtainment means 16 outputs the histograms and the widths of the edges to the analysis performance means 20 as the characteristic values S of the edges.

The analysis performance means 20 mainly performs the following two kinds of processing:

1. Obtainment of the direction of a blur in the image D and the degree of the blur in the image D; and
2. Calculation of the width L of the blur in the image D and the degree K of a motion blur in the image D.

First, the first processing will be described.

Figure 9A:
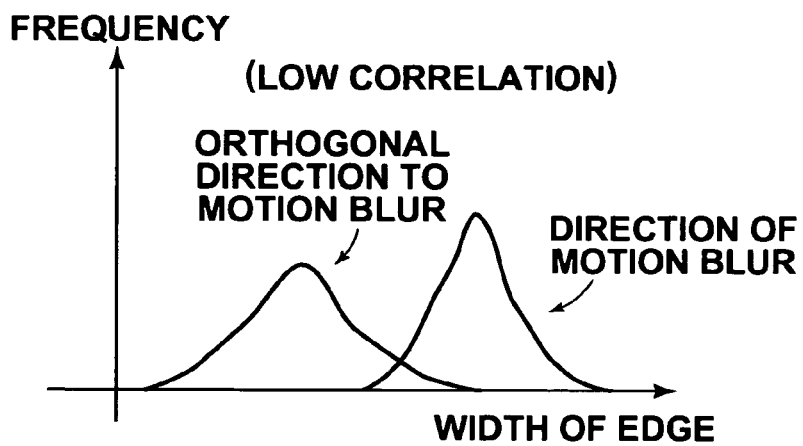
FIG. 9A is a diagram for explaining the operation of an analysis performance means 20 in the blur analysis means 50 illustrated in FIG. 5.
Figure 9B:
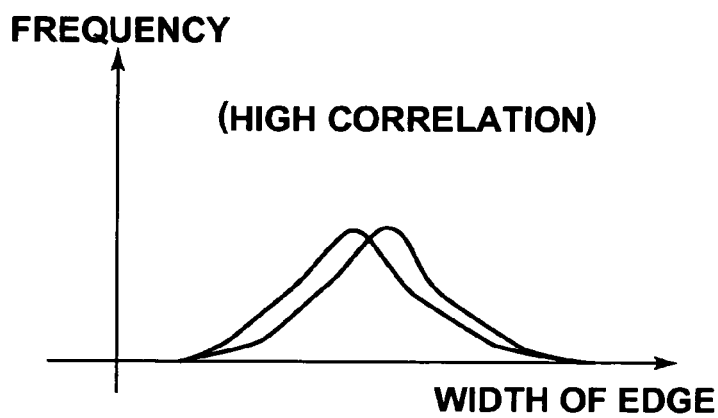
FIG. 9B is a diagram for explaining the operation of the analysis performance means 20 in the blur analysis means 50 illustrated in FIG. 5.
Figure 9C:
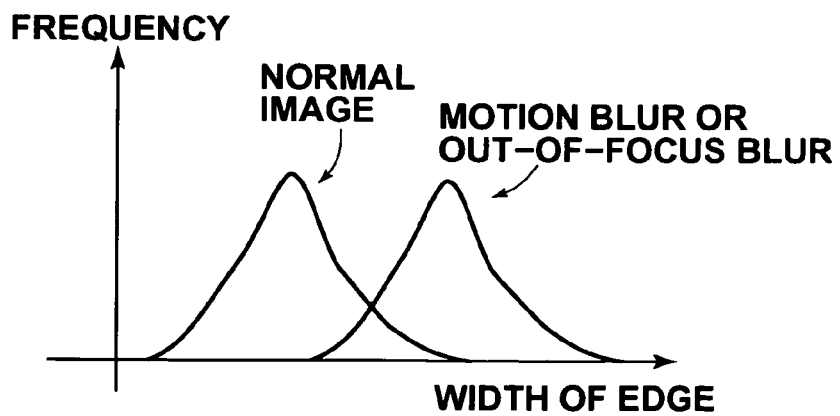
FIG. 9C is a diagram for explaining the operation of the analysis performance means 20 in the blur analysis means 50 illustrated in FIG. 5.

The analysis performance means 20 obtains a correlation value between a pair of histograms of the widths of the edges (hereinafter referred to as histograms for short) to obtain the direction of a blur in the image D. The pair of histograms is a pair of histograms for two directions (1-5, 2-6, 3-7, and 4-8) which are orthogonal to each other among the eight directions, illustrated in FIG. 6. There are many kinds of correlation values depending on the methods for obtaining the correlation values. However, there are mainly two kinds of correlation values. In one kind of correlation values, if the correlation values are high, the correlation is low. In the other kind of correlation values, the correlation value is proportional to the correlation. In other words, if the correlation value is small, the correlation is low. In the present embodiment, a correlation value of which the value is proportional to the correlation is used, for example. As illustrated in FIGS. 9A, 9B, and 9C, when a motion blur is present in an image, a correlation between a histogram for the direction of the motion blur and a histogram for the direction orthogonal to the direction of the motion blur is low (please refer to FIG. 9A). However, if the pair of histograms is a pair of histograms for mutual orthogonal directions which are different from the direction of the motion blur, or if a blur is not present in the image (no blur is present, or even if a blur is present, the blur is an out-of-focus blur), a correlation between the histograms is high (please refer to FIG. 9B). Therefore, in the analysis performance means 20 of the image processing apparatus in the present embodiment, the characteristic of the correlation values as described above is utilized. The analysis performance means 20 obtains a correlation value between each pair of histograms regarding four pairs of directions. Then, the analysis performance means 20 finds a pair of directions in which the correlation is the lowest among the four pairs. If a motion blur is present in the image D, one of the pair of directions may be judged as a direction closest to the direction of the motion blur among the eight directions illustrated in FIG. 6.

FIG. 9C is a histogram of the widths of edges in the direction of the motion blur. Here, the same subject is photographed under different photography conditions, and an image with a motion blur, an image with an out-of-focus blur, and an image without a blur (an out-of focus blur and a motion blur) are obtained. The widths of edges in the direction of the motion blur are obtained for each of the images. As illustrated in FIG. 9C, a normal image without a blur has the lowest average edge width. Therefore, in the pair of directions which was found as described above, a direction which has the largest average edge width should be a direction closest to the direction of the motion blur.

Accordingly, the analysis performance means 20 finds the pair of directions between which the correlation is the lowest, and judges that a direction which has the larger average edge width between the two directions in the pair is the direction of the blur.

Next, the analysis performance means 20 obtains the degree of a blur in the image D. The degree of the blur in the image represents how much the image is blurred. For example, the degree of the blur may be obtained by using the average edge width in the direction of the largest blur (in this case, the direction of the blur obtained as described above) in the image. However, here, the degree of the blur is obtained more accurately using a database based on the histogram illustrated in FIG. 10, which is generated using the width of each edge in the direction of the blur. FIG. 10 is a histogram showing the distribution of the widths of edges in the direction of the largest blur in the image (if the image is a normal image, it is preferable that the direction is a direction corresponding to the direction of the largest blur. However, the direction may be an arbitrary direction). The histogram is generated based on a database of normal images for learning and a database of blurred images (including out-of-focus blurs or motion blurs). Then, a ratio between a frequency (illustrated in the vertical axis) in a blurred image and a frequency (illustrated in the vertical axis) in a normal image is obtained as an evaluation value (a score in FIG. 10) for each of the widths of the edges. Then, a database (hereinafter referred to as a score database) showing a correspondence between the widths of edges and the scores is created based on FIG. 10, and the database is stored in a storage means, which is not illustrated.

The analysis performance means 20 refers to the score database, which was created based on FIG. 10, and stored in the storage means, which is not illustrated. Then, the analysis performance means 20 obtains a score based on the width of each edge in the direction of the blur in the image D. Then, the analysis performance means 20 obtains an average value of the scores of all of the edges in the direction of the blur as the degree N of the blur in the image D.

The second processing by the analysis performance means 20 will be described. First, the analysis performance means 20 obtains the degree K of a motion blur in the image D.

The degree K of the motion blur, which represents how much an image is blurred because of motion, can be obtained based on the following elements.

1. A correlation value between a pair of directions which have the lowest correlation (hereinafter referred to as lowest correlation pair): If the correlation value is lower, the degree of the motion blur is higher.

Figure 11A:
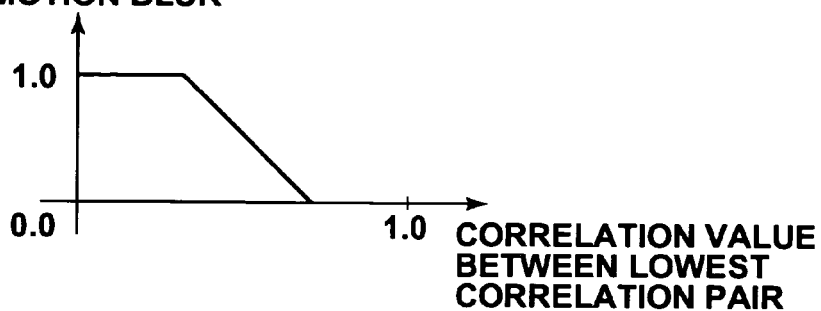
FIG. 11A is a diagram for explaining calculation of the degree of a blur.

This characteristic is utilized, and the analysis performance means 20 obtains a first degree K1 of a motion blur based on a curve illustrated in FIG. 11A. An LUT (lookup table) created based on the curve illustrated in FIG. 11A is stored in a storage means which is not illustrated. The analysis performance means 20 obtains the first degree K1 of the motion blur by reading it from the storage means which is not illustrated. The first degree K1 of the motion blur is a value corresponding to the correlation value of the lowest correlation pair.

2. An average edge width in a direction in which the average edge width is the larger between the two directions of the lowest correlation pair: If the average edge width is larger, the degree of the motion blur is higher.

Figure 11B:
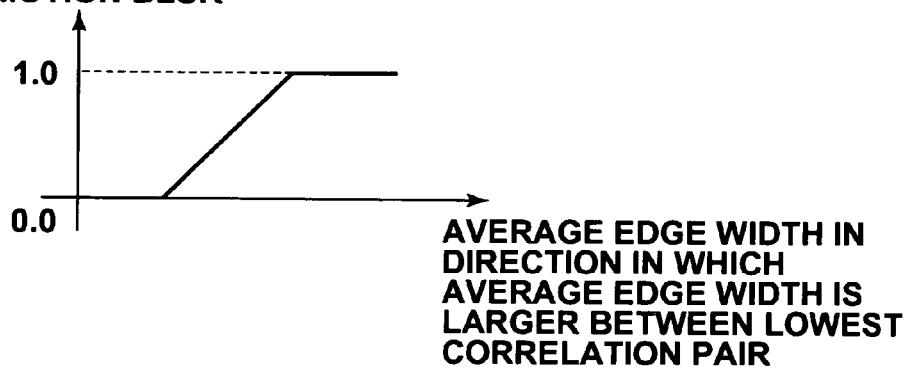
FIG. 11B is a diagram for explaining calculation of the degree of a blur.

This characteristic is utilized, and the analysis performance means 20 obtains a second degree K2 of a motion blur based on a curve illustrated in FIG. 11B. An LUT (lookup table) created based on the curve illustrated in FIG. 11B is stored in the storage means which is not illustrated. The analysis performance means 20 obtains the second degree K2 of a motion blur by reading it from the storage means which is not illustrated. The second degree K2 of the motion blur is a value which corresponds to the average edge width in a direction in which the average edge width is the larger between the lowest correlation pair.

3. A difference in the average edge width between two directions of the lowest correlation pair: If the difference is larger, the degree of a motion blur is higher.

Figure 11C:
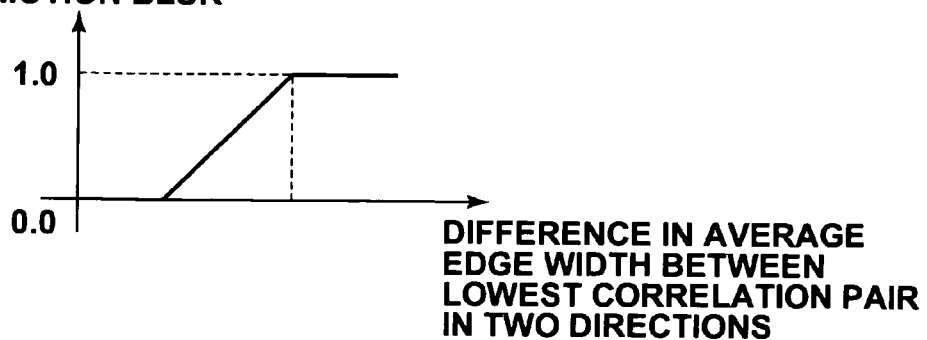
FIG. 11C is a diagram for explaining calculation of the degree of a blur.

This characteristic is utilized, and the analysis performance means 20 obtains a third degree K3 of a motion blur based on a curve illustrated in FIG. 11C. An LUT (lookup table) created based on the curve illustrated in FIG. 11C is stored in the-storage means which is not illustrated. The analysis performance means 20 obtains the third degree K3 of the motion blur by it from the storage means which is not illustrated. The third degree K3 of the motion blur corresponds to a difference in the average edge width between two directions of the lowest correlation pair.

The analysis performance means 20 obtains the first degree K1 of the motion blur, the second degree K2 of the motion blur, and the third degree K3 of the motion blur, as described above. The analysis performance means 20 also obtains the degree K of the motion blur in the blurred image D using the degrees K1, K2, and K3 according to the following equation (1).

$$K = K1 \times K2 \times K3 \tag{1}$$

Note that K: degree of motion blur;
K1: first degree of motion blur;
K2: second degree of motion blur; and
K3: third degree of motion blur.

Next, the analysis performance means 20 obtains the width L of a blur in the image D. Here, the average edge width in the direction of the blur may be obtained as the width L of the blur regardless of the degree K of the motion blur. However, in the present embodiment, an average edge width for all of the eight directions illustrated in FIG. 6 is obtained as the width L of the blur.

The analysis performance means 20 outputs the degree N of the blur, the direction of the blur, the degree K of the motion blur, and the width L of the blur as blur information Q to the correction means 120, the region determination means 60, and the region correction means 70. The analysis performance means 20 also outputs the coordinate positions of the edges other than the invalid edges removed by the edge limitation means 14 to the region determination means 60 in addition to the blur information Q. The analysis performance means 20 also outputs the characteristic value S of the edge obtained by the edge characteristic obtainment means 16 to the region determination means 60.

Figure 12:
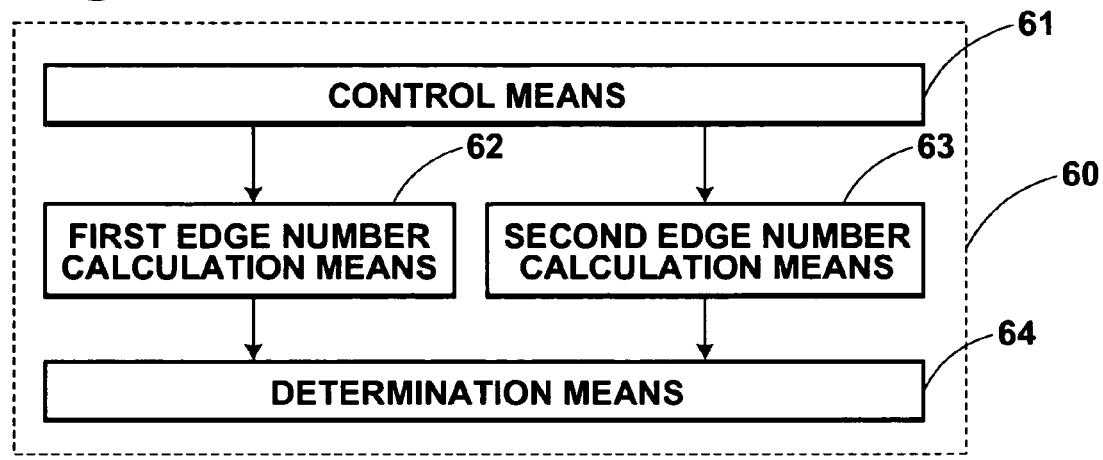
FIG. 12 is a block diagram illustrating the configuration of a region determination means 60 in the image processing apparatus illustrated in FIG. 4.

FIG. 12 is a block diagram illustrating the configuration of the region determination means 60 in the image processing apparatus according to the embodiment illustrated in FIG. 4. As illustrated in FIG. 12, the region determination means 60 includes a control means 61, a first edge number calculation means 62, a second edge number calculation means 61, and a determination means 64.

The control means 61 controls processing as to whether edge number calculation processing is performed by the first edge number calculation means 62 or the second edge number calculation means 63. The control means 63 controls processing based on the degree K of the motion blur included in the blur information Q output from the blur analysis means 50. Specifically, if the degree K of the motion blur in the image D is less than or equal to a predetermined threshold value, the control means 61 causes the first edge number calculation means 62 to perform edge number calculation processing. If the degree K of the motion blur of the image D is higher than a predetermined threshold value, the control means 61 causes the second edge number calculation means 63 to perform edge number calculation processing. Here, operations by the first edge number accumulation means 62 and the second edge number accumulation means 63 will be described.

The first edge number calculation means 62 calculates the number of edges which have the widths in a predetermined range including the width L of the blur (for example, the width of the blur ±3 pixels) for each region of the image D, which has a size corresponding to a half of the resolution of the monitor 90. In other words, the region is a region of (L1/2) pixels×(L2/2) pixels. The first edge number calculation means 62 calculates the number of edges based on the coordinate positions of the edges other than the invalid edges which were removed by the edge limitation means 14, the width of each edge included in the characteristic value S of the edge, and the width L of the blur included in the blur information Q, which were output from the blur analysis means 50. The first edge number calculation means 62 outputs the number of edges to the determination means 64.

The second edge number calculation means 63 calculates the number of edges in the same direction as the direction of the blur for each region of the image D, which has a size corresponding to a half of the resolution of the monitor 90. The second edge number calculation means 62 calculates the number of edges based on the coordinate positions of the edges other than the invalid edges removed by the edge limitation means 14, and the direction of the blur included in the blur information Q, which were output from the blur analysis means 50. The second edge number calculation means 63 outputs the number of edges to the determination means 64.

The determination means 64 determines an object region based on the number of edges in each region, output from the first edge number calculation means 62 and the second edge number calculation means 63, by selecting a region in which a largest number of edges is present as the object region.

The region correction means 70 extracts an image (hereinafter, referred to as an image D1$a$) of the object region determined by the region determination means 60 from the image D. The region correction means 70 also performs blur correction processing on the extracted image D1$a$ to obtain a corrected image D1$b$. When the region correction means 70 performs blur correction processing on the image D1$a$, the region correction means 70 sets a linear correction parameter W1 for directional correction and a two-dimensional correction parameter W2 for isotropic correction according to the following equations (2):

$$W1 = N \times K \times M1$$

$$W2 = N \times (1-K) \times M2 \qquad (2)$$

Note that W1: linear correction parameter;
W2: two-dimensional correction parameter;
N: degree of blur;
K: degree of motion blur;
M1: linear correction mask; and
M2: two-dimensional correction mask.

Specifically, the region correction means 70 sets the correction parameters W1 and W2 (a set of the correction parameters W1 and W2 is referred to as a parameter E) so that the magnitude of isotropic correction and the magnitude of directional correction become higher as the degree N of the blur is higher. Further, the correction parameters are set so that a weight for directional correction becomes higher as the degree K of the motion blur becomes higher.

Next, the region correction means 70 corrects the blur by emphasizing high frequency components in the image D1$a$ of the object region. Specifically, the region correction means 70 separates the high frequency components (referred to as high frequency components Dh1) from the image D1$a$. The region correction means 70 corrects the blur in the image D1$a$ by emphasizing the high frequency components Dh1 using the correction parameter E according to the following equation (3):

$$D1b = D1a + E \times Dh1 \qquad (3)$$

Note that D1$b$: corrected image;
D1$a$: image before correction;
Dh1: high frequency component of the image Dh1; and
E: correction parameter.

The checking image production means 80 synthesizes a checking image so that the corrected image D1$b$ obtained by the region correction means 70 and the image D1$a$ before correction processing of the corrected image D1$b$ are displayed side by side. Since the size of each of the images D1$a$ and D1$b$ is a half of the resolution of the monitor 90, the checking image which was obtained by combining the images D1$a$ and D1$b$ has the same size as that of the monitor 90. In other words, the checking image has a resolution of L1 pixels ×L2 pixels.

The monitor 90 displays the checking image obtained by the checking image production means 80. As described above, the checking image displayed on the monitor 90 is an image D1$a$ of a region which has a largest number of edges of which the widths are close to the width L of the blur (in this case, edge widths within a range of the width of blur ±3 pixels) and a corrected image D1$b$ which is obtained by correcting the image D1$a$ (if the degree K of the motion blur in the image D is less than or equal to a predetermined threshold value). Alternatively, the checking image is an image D1$a$ of a region which has a largest number of edges in the same direction as the direction of the motion blur in the image D and an image D1$b$ which is obtained by correcting the image D1$a$ (if the degree K of the motion blur in the image D is higher than the predetermined threshold value). Further, since the checking image is not reduced, even if the size of the monitor is small, the users can check the effects of correction processing by comparing the images D1$a$ and D1$b$.

The users can input instructions to suppress blur correction processing or instructions to perform blur correction processing at an input means 100 by looking at the checking image displayed on the monitor 90. The users input instructions for suppressing blur correction processing if it is not required to perform blur correction processing (or if it is even better not to perform correction processing). Specifically, the users input instructions for suppressing blur correction processing if no blur is present in both of the images D1$a$ and D1$b$, or if the condition of the blur is substantially the same between the image D1$a$ and the image D1$b$. The users also input instructions for suppressing correction processing if the degree of the blur of the image D1$b$ is higher than that of the image D1$a$. If an instruction for suppressing blur correction process is input by the user at the input means 100, the correction means 120 follows the instruction, and outputs an image D without performing correction processing. If an instruction for performing blur correction processing is input, the correction means 120 obtains a corrected image D' by performing blur correction processing on the image D, and outputs the corrected image D'. Here, the correction means 120 performs blur correction processing performed by the region correction means 70 on the whole region of the image D. Specifically, the high frequency components (referred to as high frequency components Dh) are separated from the image D, and the high frequency components Dh are emphasized by using the correction parameter E set by the region correction means 70 according to the following equation (4). Accordingly, the blur in the image D is corrected.

$$D' = D + E \times Dh \qquad (4)$$

Note that D': corrected image;
D: image before correction;
Dh: high frequency components of image D; and
E: correction parameter.

As described above, according to the second image processing apparatus in the present embodiment, the same effects as the image processing apparatus in the first embodiment, illustrated in FIG. 1, can be achieved. Further, if the degree of the motion blur in the image D is less than or equal to a predetermined threshold value, in other words, if the degree of blur in the image D is low, or no blur is present in the image D, a region of the image D, which has a largest number of edges of which the widths are close to the width L of the blur, is used as the checking region. Alternatively, if the degree of the blur in the image D is higher than the predetermined threshold value, in other words, if a motion blur is present in the image D, a region of the image D, which has the largest number of edges in the same as the direction of the blur, is used as the checking region. As described above, the checking image which is most appropriate for checking the effects of blur correction is produced based on the degree of the motion blur in the image D. Therefore, the users can more accurately check the effects of blur correction.

Further, if blur correction is performed on the entire region of the image, processing time becomes long. Therefore, in the image processing apparatus according to the present embodiment, first, blur correction processing is performed only on an image of the checking region to check the effects of blur correction. Therefore, processing time can be reduced, and the efficiency of processing is high.

So far, preferred embodiments of the present invention have been described. However, the image processing method, apparatus, and program of the present invention are not limited to the embodiments as described above. Various additions, reductions, modifications, or combinations of the embodiments as described above can be made without deviating from the spirit of the present invention.

For example, the advantages of the image processing method and apparatus according to the present invention are achieved especially when the effects of correction are checked by displaying an image on a display device which has low resolution. However, when the effects of correction are checked by displaying the image on a display device which has high resolution such as VGA (Video Graphics Array), if an image which has the same size as the resolution of the display device is extracted from the image, and displayed on the display device, the effects of blur correction may not be checked correctly. That is because since the size of the checking image is large, there are regions in which edges are concentrated, and regions in which edges are not concentrated in the checking image. Therefore, there is a possibility that regions which are appropriate for checking the effects of correction and regions which are not appropriate for checking the effects of correction are present in the checking image in a mixed manner. Hence, the present invention may be applied to a case in which the effects of correction are checked by displaying the image on a display device which has high resolution. In this case, a checking image of which the size is smaller than that of the display device is extracted from an image, and the extracted image is displayed on the display device by enlarging the image to a size which is appropriate for the resolution of the display device. Accordingly, even if the resolution of the display device is high, the effects of blur correction can be accurately checked. In this case, it is also possible that the extracted image is not enlarged to the same size as the resolution of the display device. The extracted image may be displayed without changing the size. Alternatively, the extracted image may be displayed on a part of a display screen of the display device by enlarging it to a size which is less than the resolution of the display device.

Specifically, the present invention is not limited to processing for checking the effects of blur correction performed on a large image by displaying an image on a display device which has low resolution. The present invention may be effectively applied to processing for checking the effects of blur correction by displaying an image on a display device which has high resolution.

In the image processing apparatus according to the second embodiment, as illustrated in FIG. 4, the checking region is determined based on the width of the blur in the original image and the direction of the blur in the original image. However, only one of the width of the blur or the direction of the blur may be used to determine the checking region. Further, the checking region may be determined by simply selecting a region in which the number of edges is large as in the image processing apparatus according to the first embodiment, as illustrated in FIG. 1.

Further, in the image processing apparatus according to the second embodiment, as illustrated in FIG. 4, the checking region is determined and the correction parameters are set based on the blur information obtained by analyzing the image. However, as disclosed in U.S. Patent Application Publication No. 20030002746, an apparatus (for example, an acceleration sensor) which can obtain information such as the direction of motion or the magnitude of motion during photography, may be installed in the photography apparatus. The information such as the direction of a motion blur or the width of the motion blur is obtained during photography, and blurs (motion blurs in this case) maybe corrected based on the obtained information, In this system, a checking region may be determined by selecting a region in which the number of edges having widths close to the width of the motion blur, obtained by the acceleration sensor or the like, as the checking region. Alternatively, a checking region may be determined by selecting a region in which the number of edges in the same as the direction of the blur as the checking region. The determined checking region may be provided to check the effects of blur correction.

Further, information which is used to determine the checking region and information (blur information Q in the image processing apparatus according to the second embodiment, illustrated in FIG. 4) which is used to perform blur correction may be different from each other. For example, there is a method for performing correction processing, as disclosed in Japanese Unexamined Patent Publication No. 7(1995)-121703. In this method, a deterioration function is set with respect to an image, and a blurred image is corrected by applying a restoration filter corresponding to the set deterioration function. Then, the corrected image is evaluated, and a deterioration function is set again based on the result of evaluation. Blur correction is performed by repeating correction processing, evaluation processing, and resetting of the deterioration function until an image of desired image quality is obtained. Accordingly, blurs in the image are corrected. In this system, the image processing method and apparatus according to the present invention may be used to evaluate the corrected image. The original image may be analyzed to obtain blur information. At the same time, a checking region (a region which has a largest number of edges, a region which has a largest number of edges of which the widths are close to the width of the blur in the image, or a region in which the number of edges in the same direction as the direction of the blur in the image) in the original image may be determined. Then, the checking image may be extracted from the image which has been corrected by applying a filter corresponding to the deterioration function. Then, the effects of correction may be checked to perform evaluation.

What is claimed is:

1. An image processing method comprising the steps of:
   determining a blur checking region by selecting a region in which a blur tends to clearly appear in a digital photograph image as the blur checking region, by:
      extracting edges from the digital photograph image;
      obtaining the number of the extracted edges for each of a plurality of regional images having the same size, which are formed by dividing the digital photograph image into blocks; and
      determining the blur checking region by selecting a region corresponding to a regional image which has a largest number of the edges as the blur checking region;
   obtaining an image of a region corresponding to the blur checking region as a checking image in a corrected image obtained by performing blur correction processing on the digital photograph image; and
   displaying the obtained checking image in a size appropriate for the resolution of a display device.

2. An image processing method as defined in claim 1, wherein an image of the blur checking region is extracted from the digital photograph image, and displayed on the display device together with the checking image.

3. An image processing method as defined in claim 1, further comprising the steps of:
   extracting edges from the digital photograph image;
   obtaining the width of a blur in the digital photograph image;
   obtaining the number of edges which have the same width as that of the blur for each of a plurality of regional images having the same size, which are formed by dividing the digital photograph image into blocks; and
   determining the blur checking region by selecting a region corresponding to a regional image which has a largest number of the edges as the blur checking region.

4. An image processing method as defined in claim 3, wherein the size of each of the plurality of regional images is determined based on the resolution of the display device.

5. An image processing method as defined in claim 1, wherein the blur is a motion blur which is a directional blur, the method further comprising the steps of:
   extracting edges from the digital photograph image for each of a plurality of different directions;
   obtaining the direction of the motion blur in the digital photograph image;
   obtaining the number of edges in the same direction as that of the motion blur for each of a plurality of regional images having the same size, which are formed by dividing the digital photograph image into blocks; and
   determining the blur checking region by selecting a region corresponding to a regional image which has a largest number of the edges as the blur checking region.

6. An image processing method as defined in claim 5, wherein the size of each of the plurality of regional images is determined based on the resolution of the display device.

7. An image processing method as defined in claim 1, wherein the size of each of the plurality of regional images is determined based on the resolution of the display device.

8. An image processing apparatus comprising:
   a blur checking region determination means for determining a blur checking region by selecting a region in which a blur tends to clearly appear in a digital photograph image as the blur checking region;
   a checking image obtainment means for obtaining an image of a region corresponding to the blur checking region as a checking image in a corrected image obtained by performing blur correction processing on the digital photograph image; and
   a display control means for displaying the obtained checking image in a size appropriate for the resolution of a display device,
   wherein the blur checking region determination means includes an edge extraction means for extracting edges from the digital photograph image, an edge number calculation means for obtaining the number of the extracted edges for each of a plurality of regional images having the same size, which are formed by dividing the digital photograph image into blocks, and a determination means for determining the blur checking region by selecting a region corresponding to a regional image which has a largest number of the edges as the blur checking region.

9. An image processing apparatus as defined in claim 8, wherein the checking image obtainment means further extracts an image of the blur checking region from the digital photograph image, and wherein the display control means displays the checking image on the display device together with the image of the blur checking region in the digital photograph image.

10. An image processing apparatus as defined in claim 8, wherein the blur checking region determination means includes an edge extraction means for extracting edges from the digital photograph image, a blur width obtainment means for obtaining the width of a blur in the digital photograph image, an edge number calculation means for obtaining the number of edges which have the same width as that of the blur for each of a plurality of regional images having the same size, which are formed by dividing the digital photograph image into blocks, and a determination means for determining the blur checking region by selecting a region corresponding to a regional image which has a largest number of the edges as the blur checking region.

11. An image processing apparatus as defined in claim 10, wherein the size of each of the plurality of regional images is determined based on the resolution of the display device.

12. An image processing apparatus as defined in claim 8, wherein the blur is a motion blur which is a directional blur, and wherein the blur checking region determination means includes an edge extraction means for extracting edges from the digital photograph image for each of a plurality of different directions, a motion blur direction obtainment means for obtaining the direction of the motion blur in the digital photograph image, an edge number calculation means for obtaining the number of edges in the same direction as that of the motion blur for each of a plurality of regional images having the same size, which are formed by dividing the digital photograph image into blocks, and a determination means for determining the blur checking region by selecting a region corresponding to a regional image which has a largest number of the edges as the blur checking region.

13. An image processing apparatus as defined in claim 12, wherein the size of each of the plurality of regional images is determined based on the resolution of the display device.

14. An image processing apparatus as defined in claim 8, wherein the size of each of the plurality of regional images is determined based on the resolution of the display device.

15. A computer readable memory in which a program for causing a computer to execute an image processing method is recorded, the program comprising the procedures for:

blur checking region determination to determine a blur checking region by selecting a region in which a blur tends to clearly appear in a digital photograph image as the blur checking region;

checking image obtainment to obtain an image of a region corresponding to the blur checking region as a checking image in a corrected image obtained by performing blur correction processing on the digital photograph image; and display control to display the obtained checking image in a size appropriate for the resolution of a display devices, wherein the procedure for blur checking region determination includes a procedure for extracting edges from the digital photograph image, a procedure for obtaining the number of the extracted edges for each of a plurality of regional images having the same size, which are formed by dividing the digital photograph image into blocks, and a procedure for determining the blur checking region by selecting a region corresponding to a regional image which has a largest number of the edges as the blur checking region.

16. A computer readable memory as defined in claim 15, wherein the procedure for checking image obtainment is a procedure for further extracting an image of the blur checking region from the digital photograph image, and wherein the procedure for display control is a procedure for displaying the checking image on the display device together with the image of the blur checking region in the digital photograph image.

17. A computer readable memory as defined in claim 15, wherein the procedure for blur checking region determination includes a procedure for extracting edges from the digital photograph image, a procedure for blur width obtainment to obtain the width of a blur in the digital photograph image, a procedure for obtaining the number of edges which have the same width as that of the blur for each of a plurality of regional images having the same size, which are formed by dividing the digital photograph image into blocks, and a procedure for determining the blur checking region by selecting a region corresponding to a regional image which has a largest number of the edges as the blur checking region.

18. A computer readable memory as defined in claim 17, wherein the size of each of the plurality of regional images is determined based on the resolution of the display device.

19. A computer readable memory as defined in claim 15, wherein the blur is a motion blur which is a directional blur, and wherein a procedure for blur checking region determination includes a procedure for extracting edges from the digital photograph image for each of a plurality of different directions, a procedure for obtaining the direction of the motion blur in the digital photograph image, a procedure for obtaining the number of edges in the same direction as that of the motion blur for each of a plurality of regional images having the same size, which are formed by dividing the digital photograph image into blocks, and a procedure for determining the blur checking region by selecting a region corresponding to a regional image which has a largest number of the edges as the blur checking region.

20. A computer readable memory as defined in claim 19, wherein the size of each of the plurality of regional images is determined based on the resolution of the display device.

21. A computer readable memory as defined in claim 15, wherein the size of each of the plurality of regional images is determined based on the resolution of the display device.

* * * * *